(12) United States Patent
Wickham et al.

(10) Patent No.: US 11,926,249 B2
(45) Date of Patent: Mar. 12, 2024

(54) ADJUSTABLE HEAD REST ASSEMBLY AND SYSTEM

(71) Applicant: B/E Aerospace, Inc., Winston-Salem, NC (US)

(72) Inventors: Arnold J. Wickham, Summerton, SC (US); Richard Dishman, Mooresville, NC (US); Brett A. Hall, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/669,000

(22) Filed: Feb. 10, 2022

(65) Prior Publication Data

US 2023/0249598 A1    Aug. 10, 2023

(51) Int. Cl.
| | | |
|---|---|---|
| *B60N 2/85* | (2018.01) | |
| *B60N 2/821* | (2018.01) | |
| *B60N 2/868* | (2018.01) | |
| *B60N 2/885* | (2018.01) | |
| *B64D 11/06* | (2006.01) | |

(52) U.S. Cl.
CPC ............ *B60N 2/85* (2018.02); *B60N 2/821* (2018.02); *B60N 2/868* (2018.02); *B60N 2/885* (2018.02); *B64D 11/0642* (2014.12)

(58) Field of Classification Search
CPC .......... B60N 2/85; B60N 2/821; B60N 2/885; B60N 2/868; B64D 11/0642
See application file for complete search history.

(56) References Cited

U.S. PATENT DOCUMENTS

| | | | | |
|---|---|---|---|---|
| 3,608,965 A | * | 9/1971 | Cziptschirsch | ........ B60N 2/818 297/410 |
| 5,586,810 A | * | 12/1996 | Liu | ......... B60N 2/885 128/845 |
| 6,467,846 B2 | | 10/2002 | Clough | |
| 7,040,705 B2 | * | 5/2006 | Clough | ................. A47C 7/383 297/391 |
| 7,080,886 B2 | | 7/2006 | Bauer | |
| 7,201,448 B2 | * | 4/2007 | Williamson | ....... B60N 2/01508 297/410 |

(Continued)

FOREIGN PATENT DOCUMENTS

| | | |
|---|---|---|
| CN | 211641957 U | 10/2020 |
| DE | 202006016277 U1 | 4/2007 |

(Continued)

*Primary Examiner* — Philip F Gabler
(74) *Attorney, Agent, or Firm* — Suiter Swantz pc llo

(57) ABSTRACT

A system may include an adjustable headrest assembly. The adjustable headrest assembly may include a headrest center bracket, a left vertical side plate track, a left headrest side plate assembly including a left headrest side plate, a right vertical side plate track, and a right headrest side plate assembly including a right headrest side plate. The left headrest side plate may be configured to move up and down relative to the left vertical side plate track based on the engagement of the left headrest side plate assembly with the left vertical side plate track. The right headrest side plate may be configured to move up and down relative to the right vertical side plate track based on the engagement of the right headrest side plate assembly with the right vertical side plate track.

11 Claims, 16 Drawing Sheets

(56) References Cited

U.S. PATENT DOCUMENTS

| | | | |
|---|---|---|---|
| 7,264,313 B2* | 9/2007 | Clough | B60N 2/885 |
| | | | 297/409 |
| 8,007,045 B2 | 8/2011 | Meiller et al. | |
| 8,814,266 B2 | 8/2014 | Guering | |
| 9,028,000 B2* | 5/2015 | Millan | B60N 2/24 |
| | | | 297/391 |
| 9,611,041 B2* | 4/2017 | Baker | B64D 11/0642 |
| 9,783,304 B2* | 10/2017 | Zheng | B60N 2/85 |
| 10,807,719 B2 | 10/2020 | Wanner et al. | |
| 10,843,608 B2* | 11/2020 | Carlson | B60N 2/885 |
| 10,960,801 B2* | 3/2021 | Novin | B60N 2/85 |
| 11,267,382 B2* | 3/2022 | Clough | B60N 2/885 |
| 2013/0175393 A1 | 7/2013 | Udriste et al. | |

FOREIGN PATENT DOCUMENTS

| | | |
|---|---|---|
| DE | 102011012161 A1 | 8/2012 |
| FR | 2875190 A1 | 3/2006 |
| WO | 2013102735 A1 | 7/2013 |

\* cited by examiner

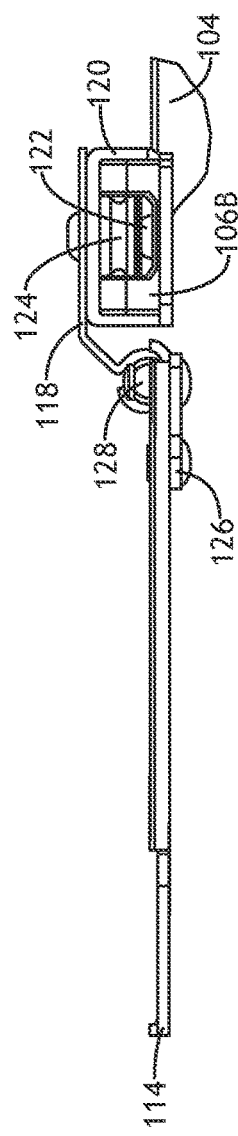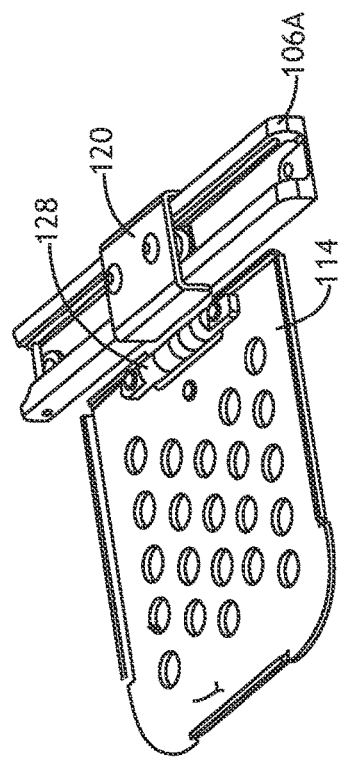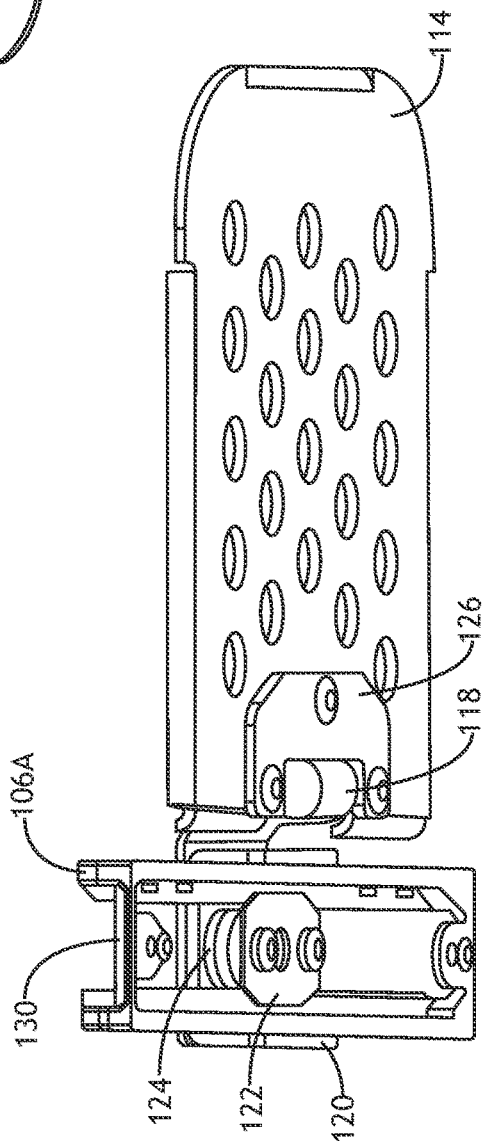

ADJUSTABLE HEAD REST ASSEMBLY AND SYSTEM

BACKGROUND

Currently, aircraft passenger seat headrests do not accommodate passenger adjustment to account for varying heights of passengers. Additionally, current aircraft passenger seat headrests only allow the side wings to rotate away from the headrest, while lacking any other means of adjustment.

SUMMARY

In one aspect, embodiments of the inventive concepts disclosed herein are directed to a system. The system may include an adjustable headrest assembly. The adjustable headrest assembly may include: a headrest center bracket; a left vertical side plate track positioned at a left side of the headrest center bracket; a left headrest side plate assembly including a left headrest side plate, the left headrest side plate assembly engaged with the left vertical side plate track, wherein the left headrest side plate is configured to move up and down relative to the left vertical side plate track based on the engagement of the left headrest side plate assembly with the left vertical side plate track; a right vertical side plate track positioned at a right side of the headrest center bracket; and a right headrest side plate assembly including a right headrest side plate, the right headrest side plate assembly engaged with the right vertical side plate track, wherein the right headrest side plate is configured to move up and down relative to the right vertical side plate track based on the engagement of the right headrest side plate assembly with the right vertical side plate.

In one aspect, embodiments of the inventive concepts disclosed herein are directed to a system. The system may include an adjustable headrest assembly. The adjustable headrest assembly may include: a headrest center bracket; a left headrest side plate assembly comprising a left headrest side plate; a right headrest side plate assembly comprising a right headrest side plate; and a mounting plate assembly. The mounting plate assembly may include a mounting plate. The mounting plate may be positioned behind the headrest center bracket, wherein the headrest center bracket is configured to rotate about a fore-aft axis positioned at a central location of the headrest center bracket, the fore-aft axis extending laterally forward and aft between the mounting plate and the headrest center bracket, wherein the left headrest side plate and the right headrest side plate rotate with the headrest center bracket.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 10 is a bottom view of the right headrest side plate assembly of the adjustable headrest assembly of FIG. 1 according to the inventive concepts disclosed herein.

FIG. 11 is a rear perspective view of the left headrest side plate assembly of the adjustable headrest assembly of FIG. 1 according to the inventive concepts disclosed herein.

FIG. 12 is a front perspective view of the left headrest side plate assembly of the adjustable headrest assembly of FIG. 1 according to the inventive concepts disclosed herein.

DETAILED DESCRIPTION

Figure 1:
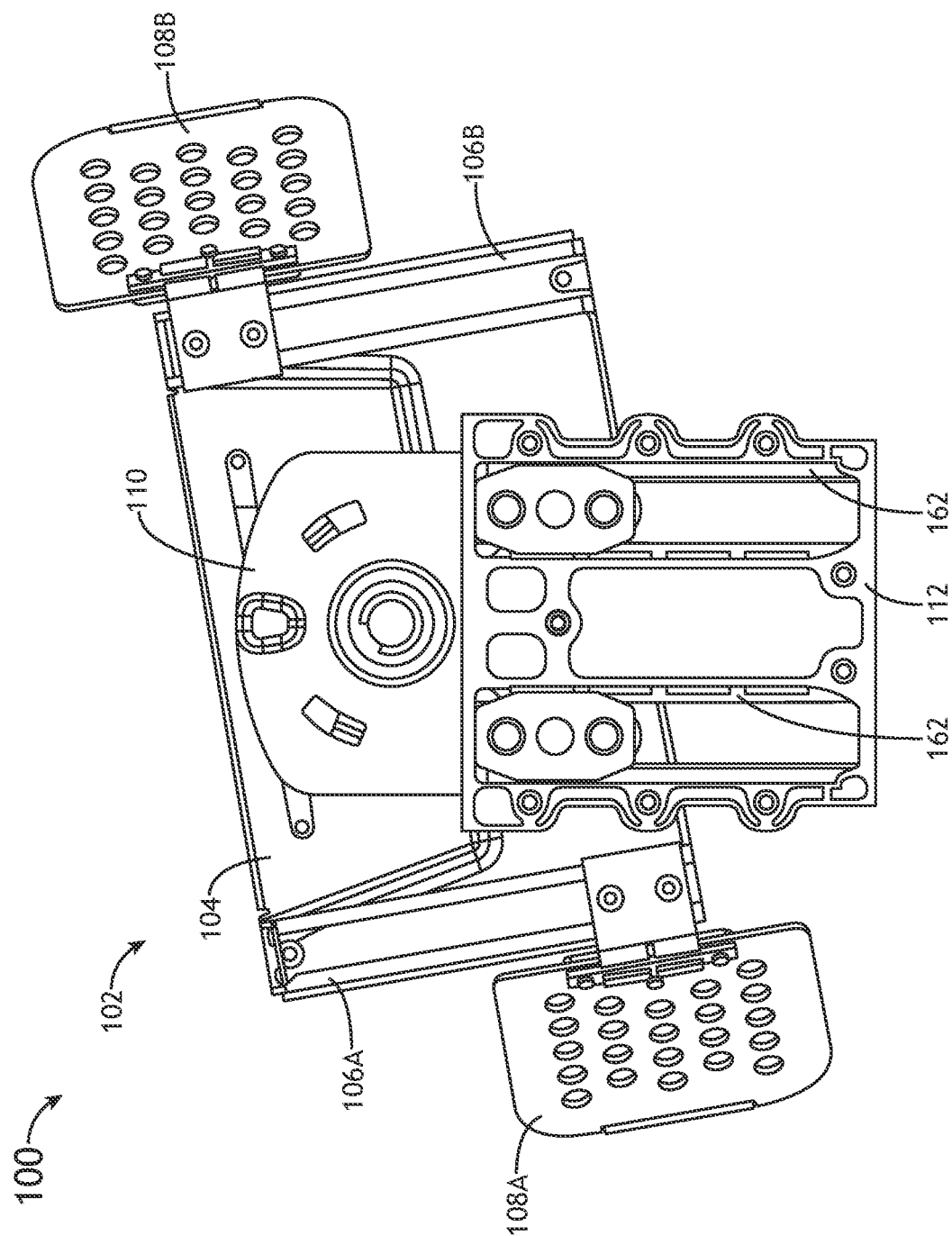
FIG. 1 is a rear view of an exemplary embodiment of a system including a seat including an adjustable headrest assembly according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system including an adjustable headrest assembly. In some embodiments, the adjustable headrest assembly is a high degree of freedom adjustable headrest assembly. In some embodiments, the adjustable headrest assembly allows the headrest to rotate and/or to move up or down. In some embodiments, the adjustable headrest assembly allows headrest side wings to be independently moved up and/or down.

In some embodiments, the adjustable headrest assembly allows a passenger to customize multiple positions and rotations of the adjustable headrest assembly to increase comfort for the passenger. Additionally, in one exemplary embodiment, the adjustable headrest assembly can be implemented with 0.060 inches of encroachment into the passenger space as compared to existing headrests, though thinner embodiments are contemplated. In some embodiments, the adjustable headrest assembly may accommodate passenger adjustment to account for varying heights of passengers, as well as varying passenger preferences and passenger positions.

Referring generally to FIGS. 1-20, an exemplary embodiment of a system (e.g., a vehicle, such as an aircraft) including at least one seat 100 (e.g., a vehicular seat, such as an aircraft seat) is depicted according to the inventive concepts. Each seat 100 may include at least one adjustable headrest assembly 102 (e.g., an adjustable aircraft headrest assembly).

Referring now to FIG. 1, a rear view of an exemplary position of an exemplary embodiment of a system including a seat 100 including at least one adjustable headrest assembly 102 is depicted according to the inventive concepts. Each adjustable headrest assembly 102 may include a headrest center bracket 104, a left vertical side plate track 106A positioned at a left side of the headrest center bracket 104, a left headrest side plate assembly 108A, a right vertical side plate track 106B positioned at a right side of the headrest center bracket 104, a right headrest side plate assembly 108B, a mounting plate assembly 110, and/or a seatback mount plate 112 having at least one (e.g., two) vertical track 162. As shown in FIG. 1, the adjustable headrest assembly 102 is in an up and rotated position with the left headrest side plate assembly 108A and the right headrest side plate assembly 108B tilted forward. Additionally, the left headrest side plate assembly 108A is in a down position with the left headrest side plate assembly 108A positioned in a lower portion of the left vertical side plate track 106A. Additionally, the right headrest side plate assembly 108B is in an up position with the right headrest side plate assembly 108B positioned in an upper portion of the right vertical side plate track 1066.

Figure 2:
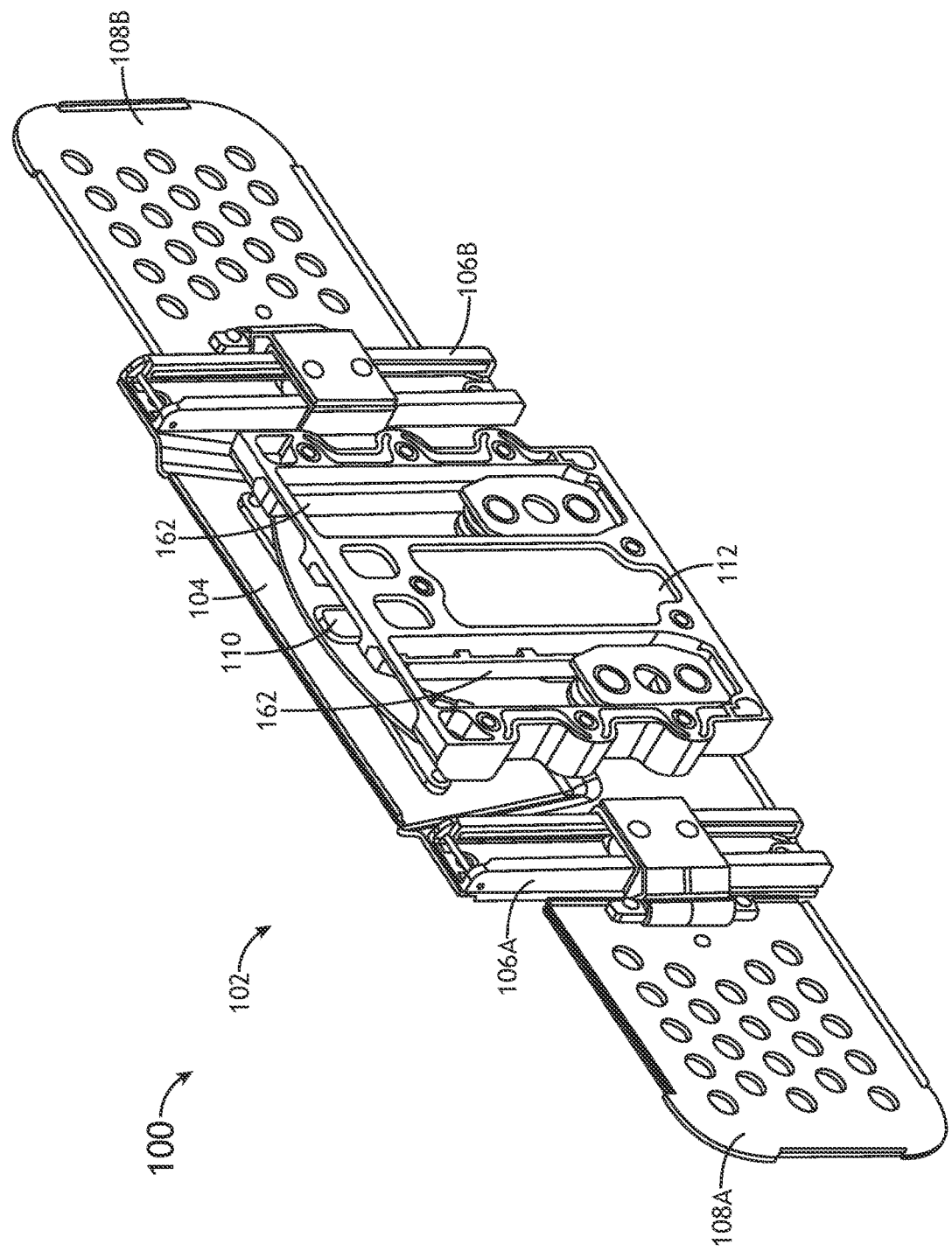
FIG. 2 is a rear perspective view of an exemplary position of the adjustable headrest assembly of FIG. 1 according to the inventive concepts disclosed herein.

Referring now to FIG. 2, a rear perspective view of an exemplary position of the adjustable headrest assembly 102 of FIG. 1 is depicted according to the inventive concepts. As shown in FIG. 2, the adjustable headrest assembly 102 is in a down and centered position with the left headrest side plate assembly 108A and the right headrest side plate assembly 108B tilted to be in line with the headrest center bracket 104. Additionally, the left headrest side plate assembly 108A is in a centered position with the left headrest side plate assembly 108A positioned in a center portion of the left vertical side plate track 106A. Additionally, the right headrest side plate assembly 108B is in a centered position with the right headrest side plate assembly 108B positioned in a center portion of the right vertical side plate track 106B.

Figure 3:
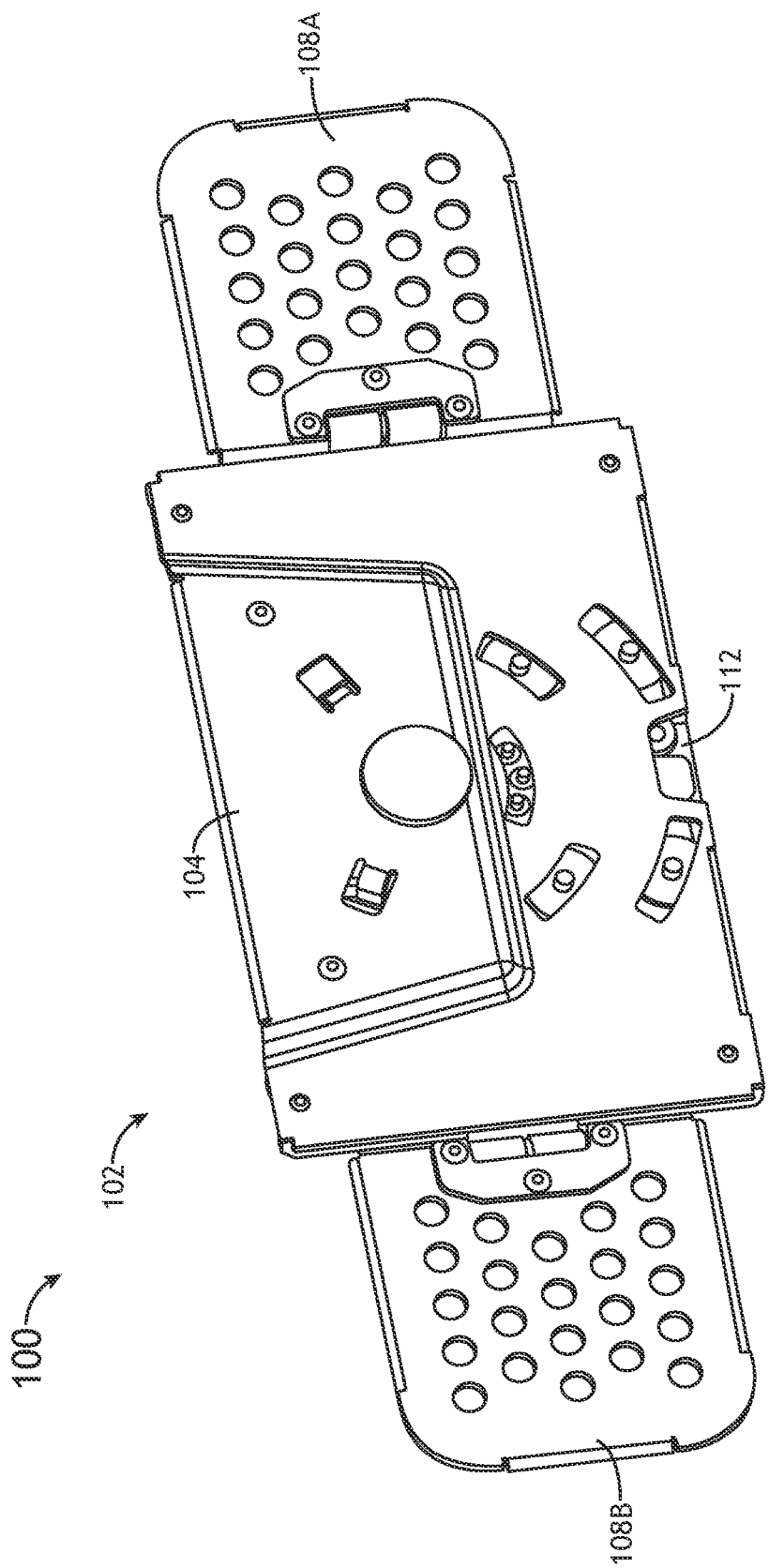
FIG. 3 is a front perspective view of the position of the adjustable headrest assembly of FIG. 2 according to the inventive concepts disclosed herein.

Referring now to FIG. 3, a front perspective view of the position of the adjustable headrest assembly 102 of FIG. 2 is depicted according to the inventive concepts.

Figure 4:
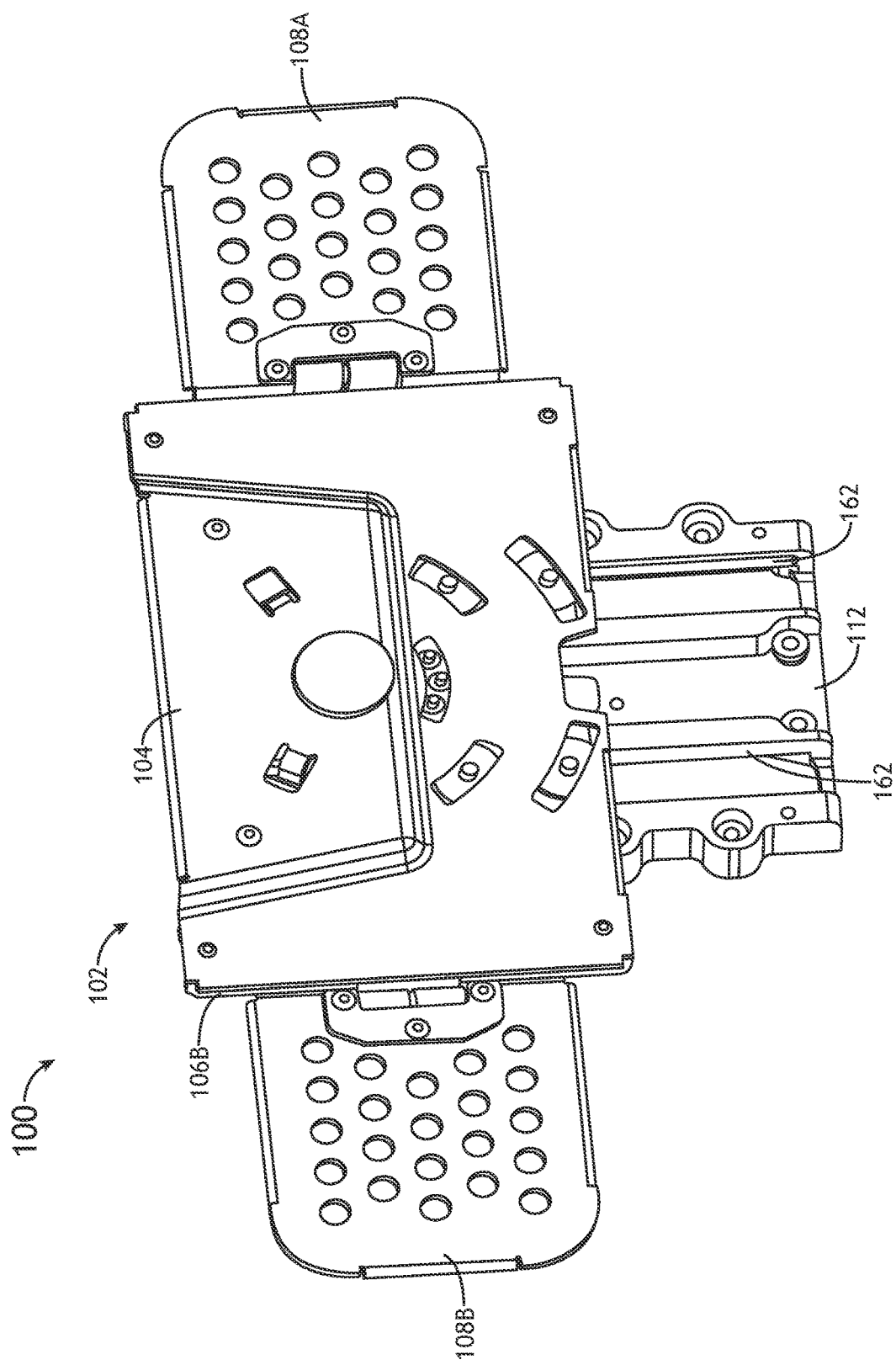
FIG. 4 is a front perspective view of an exemplary position of the adjustable headrest assembly of FIG. 1 according to the inventive concepts disclosed herein.
Figure 6:
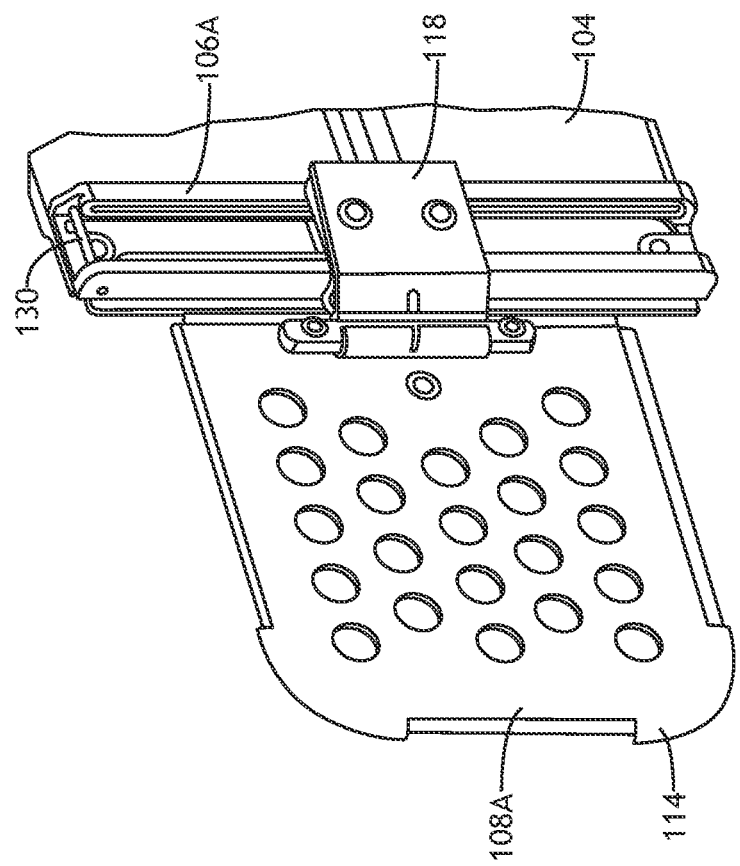
FIG. 6 is a rear perspective view of the left headrest side plate assembly of the adjustable headrest assembly of FIG. 1 according to the inventive concepts disclosed herein.

Referring now to FIG. 4, a front perspective view of an exemplary position of the adjustable headrest assembly 102 of FIG. 1 is depicted according to the inventive concepts. As shown in FIG. 4, the adjustable headrest assembly 102 is in a fully up and centered position with the left headrest side plate assembly 108A and the right headrest side plate assembly 108B tilted to be in line with the headrest center bracket 104. Additionally, the left headrest side plate assembly 108A is in a centered position with the left headrest side plate assembly 108A positioned in a center portion of the left vertical side plate track 106A. Additionally, the right headrest side plate assembly 108B is in a centered position with the right headrest side plate assembly 108B positioned in a center portion of the right vertical side plate track 106B.

Figure 5:
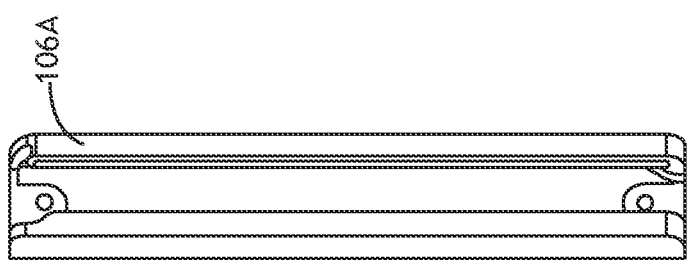
FIG. 5 is a view of one of the left vertical side plate track or the right vertical side plate track of the adjustable headrest assembly of FIG. 1 according to the inventive concepts disclosed herein.
Figure 7:
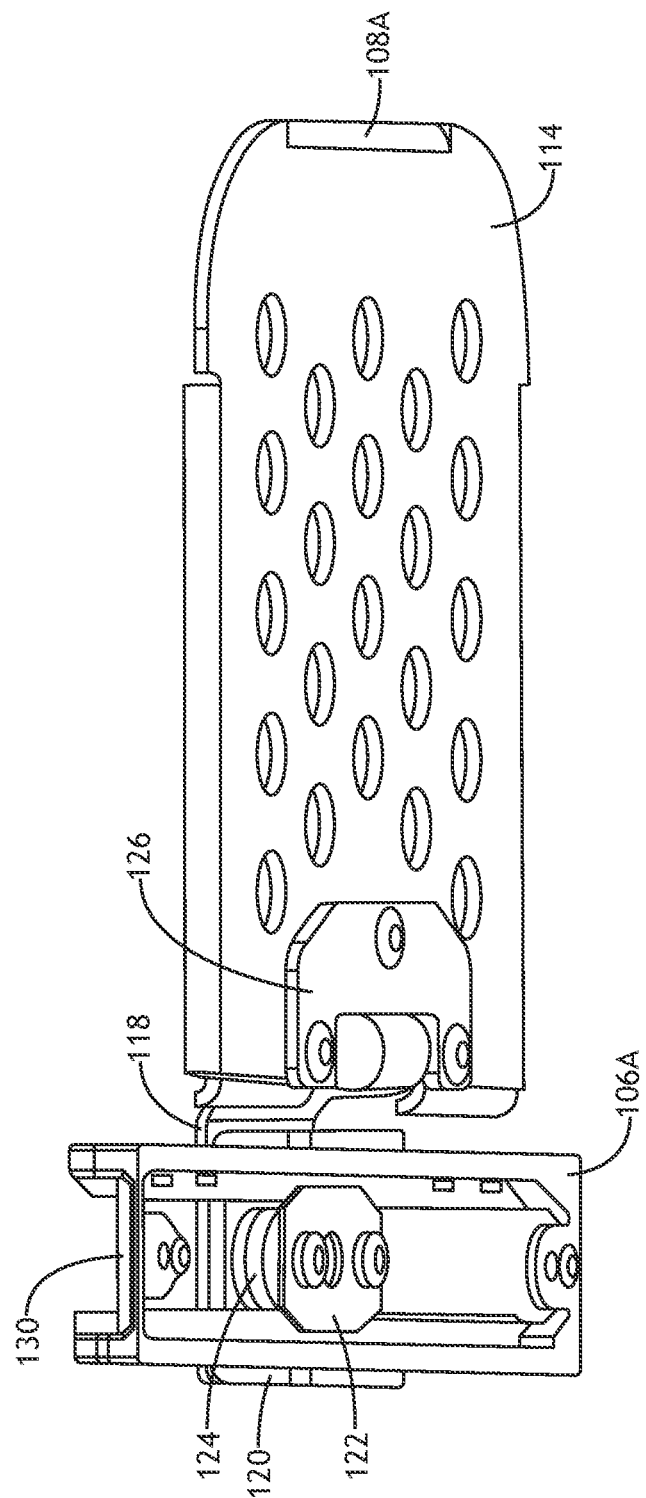
FIG. 7 is a front perspective view of the left headrest side plate assembly of the adjustable headrest assembly of FIG. 1 according to the inventive concepts disclosed herein.
Figure 8:
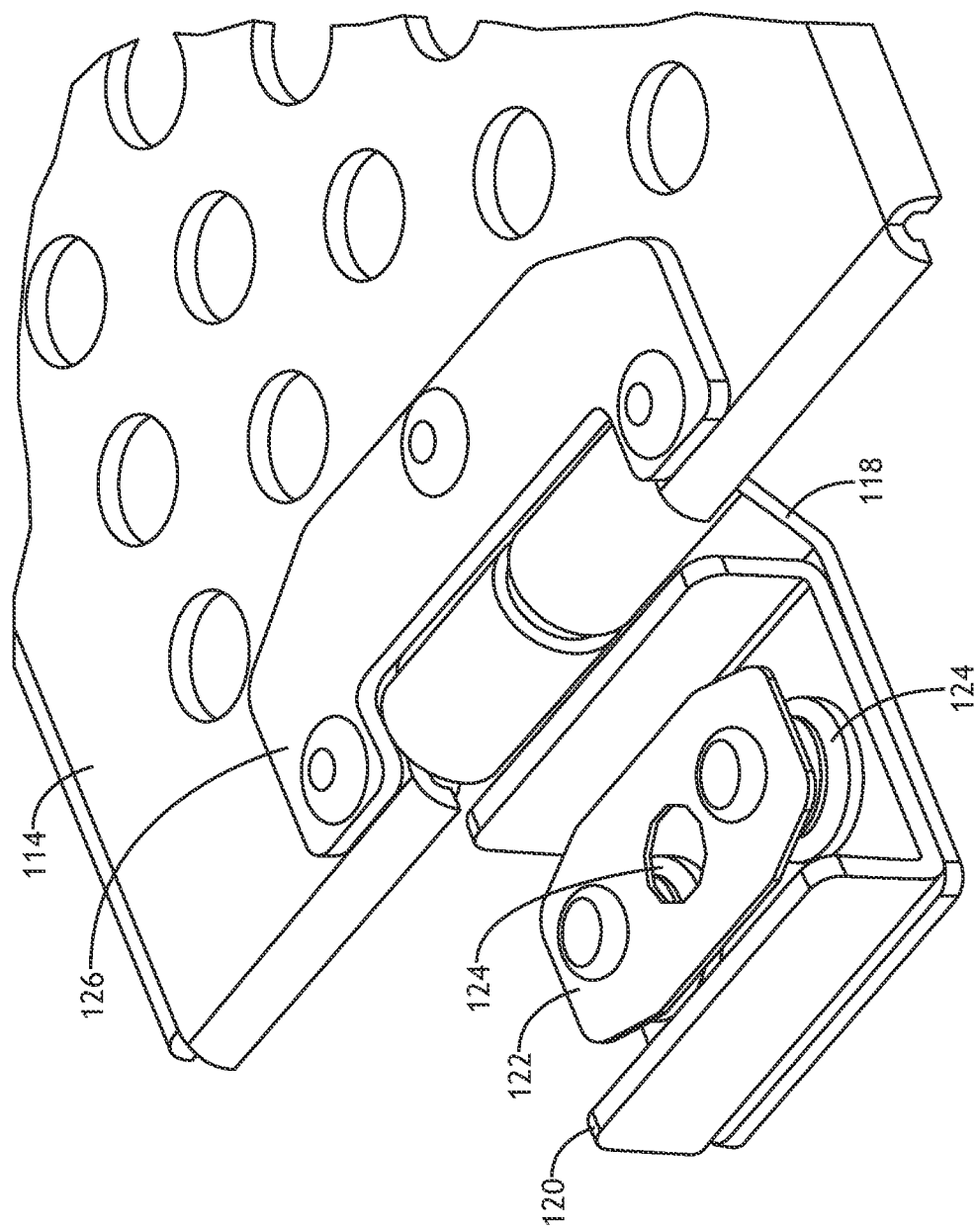
FIG. 8 is a front perspective view of the left headrest side plate assembly of the adjustable headrest assembly of FIG. 1 according to the inventive concepts disclosed herein.
Figure 9:
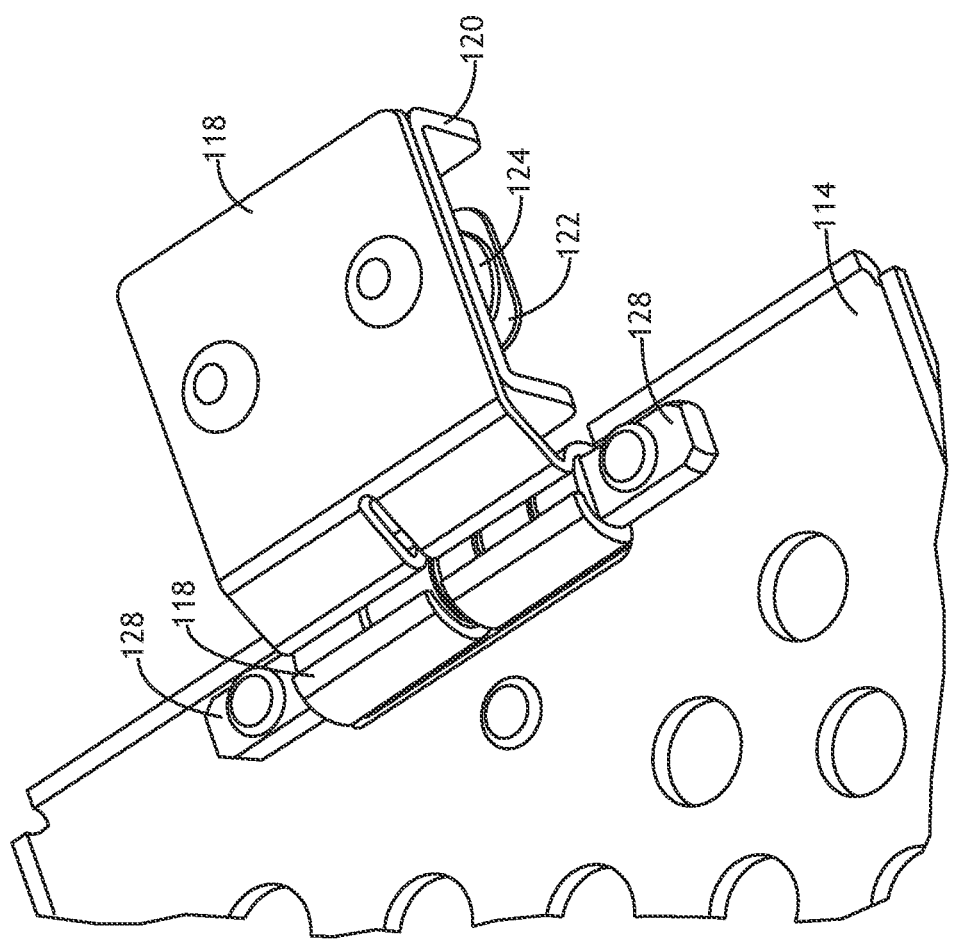
FIG. 9 is a rear perspective view of the left headrest side plate assembly of the adjustable headrest assembly of FIG. 1 according to the inventive concepts disclosed herein.

Referring now to FIG. 5, a view of one of the left vertical side plate track 106A or the right vertical side plate track 106B of the adjustable headrest assembly 102 of FIG. 1 is depicted according to the inventive concepts. The left vertical side plate track 106A may be positioned at a left side of the headrest center bracket 104. The right vertical side plate track 106B may be positioned at a right side of the headrest center bracket 104.

Referring now to FIG. 6-12, multiple views of the left headrest side plate assembly 108A and the right headrest side plate assembly 10B of the adjustable headrest assembly 102 of FIG. 1 are depicted according to the inventive concepts. Each of the left headrest side plate assembly 108A and the right headrest side plate assembly 10B may be engaged with one of the the left vertical side plate track 106A or the right vertical side plate track 106B.

Each of the left headrest side plate assembly 108A and the right headrest side plate assembly 10B may include a headrest side plate 114 (e.g., a headrest side plate wing). For example, the left headrest side plate 114 may be configured to move up and down relative to the left vertical side plate track 106A based on the engagement of the left headrest side plate assembly 108A with the left vertical side plate track 106A. For example, the right headrest side plate 114 may be configured to move up and down relative to the right vertical side plate track 106B based on the engagement of the right headrest side plate assembly 108B with the right vertical side plate track 106B. In some embodiments, the headrest side plates 114 may be configured to move up and down a full height of the headrest center bracket 104. Each of the left and right vertical side plate track 106A, 106B may have at least one stop pin 130.

For example, the left headrest side plate 114 may be configured to rotate fore and aft about an axis positioned along an edge (e.g., a left edge) of the head rest center bracket 104. For example, the right headrest side plate 114 may be configured to rotate fore and aft about another axis positioned along another edge (e.g., a right edge) of the head rest center bracket 104, wherein the right headrest side plate 114 may be configured to rotate fore and aft independently of the left headrest side plate 114 being configured to rotate fore and aft.

Each of the left headrest side plate assembly 108A and the right headrest side plate assembly 10B may further include: a clamp pin (e.g., a friction clamp pin 116) attached to the headrest side plate 114; a clamp (e.g., a friction clamp 118) rotatably engaged with the friction clamp pin 116 such that the headrest side plate 114 is able to rotate fore and aft about the axis; a torque block 120 attached to the friction clamp 118; a roller plate 122 attached to the torque block 120; at least one (e.g., two) roller 124 (e.g., at least one friction roller) positioned between the roller plate 122 and the torque block 120, wherein the at least one roller 124 engages with one of the left or right vertical side plate track 106A, 106B such that the headrest side plate 114 is able to move up and down relative to the headrest center bracket 104; and/or a headrest side plate doubler 126 attached to the headrest side plate 114 and the friction clamp pin 116. For example, the torque block 120 may mount between the friction clamp and the rollers 124. The torque block 120 may translate any torque about the left or right vertical side plate track 106A, 106B into the headrest center bracket 104. The torque block 120 may serve as an attachment point for the rollers 124 and the roller plate 122.

Referring now to FIG. 13-20, multiple views of the mounting plate assembly 110 of the adjustable headrest assembly 102 of FIG. 1 are depicted according to the inventive concepts. The mounting plate assembly 110 may serve as an alignment mechanism.

The mounting plate assembly 110 may include a mounting plate 11. The mounting plate 111 may be positioned behind the headrest center bracket 104. The headrest center bracket 104 may be configured to rotate about a fore-aft axis positioned at a central location (e.g., extending through the friction pivot assembly 136) of the headrest center bracket 104. The fore-aft axis may extend laterally forward and aft between the mounting plate 111 and the headrest center bracket 104, wherein the left headrest side plate 108A and the right headrest side plate 108B rotate with the headrest center bracket 104. The mounting plate 111 may further include a center position detent 134.

Figure 14:
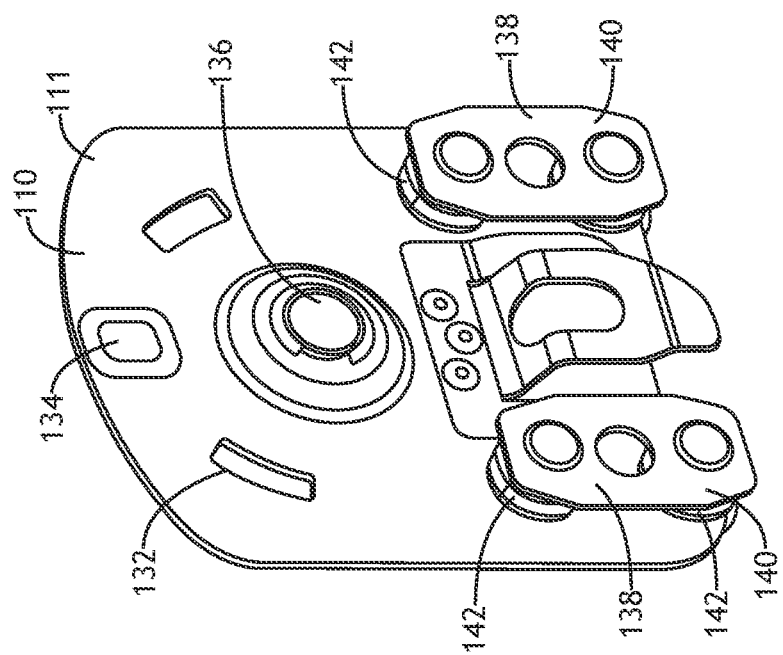
FIG. 14 is a rear perspective view of the mounting plate assembly of the adjustable headrest assembly of FIG. 1 according to the inventive concepts disclosed herein.
Figure 13:
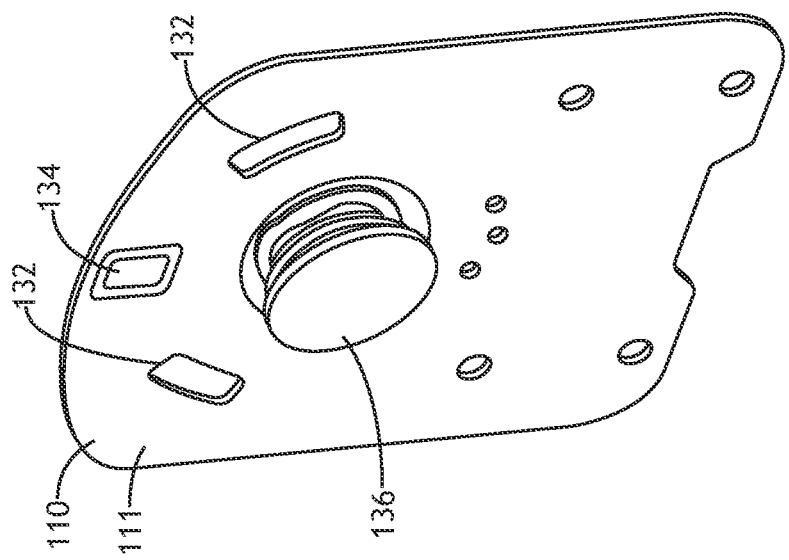
FIG. 13 is a front perspective view of the mounting plate assembly of the adjustable headrest assembly of FIG. 1 according to the inventive concepts disclosed herein.
Figure 15:
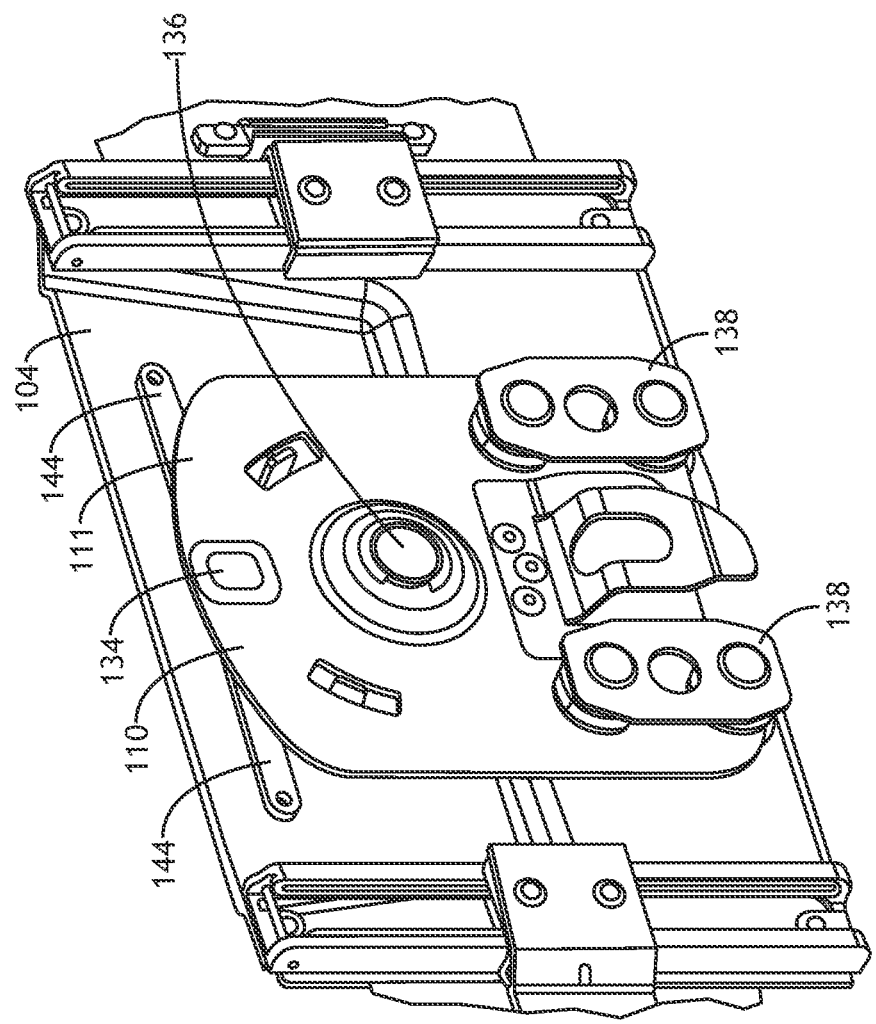
FIG. 15 is a rear perspective view of the adjustable headrest assembly of FIG. 1 according to the inventive concepts disclosed herein.

As shown in FIG. 14, the mounting plate assembly 110 may further include at least one (e.g., two) roller assembly 138. Each of the at least one roller assembly 138 may include: a roller plate 140 attached to the mounting plate 111; and/or at least one (e.g., two) roller 142 positioned between the roller plate 140 and the mounting plate 111, wherein the at least one roller 142 engages with one of the at least one (e.g., two) vertical track 162 of the seatback mount plate 112 such that the mounting plate 111 is able to move up and down relative to the seatback mount plate 112.

Figure 17:
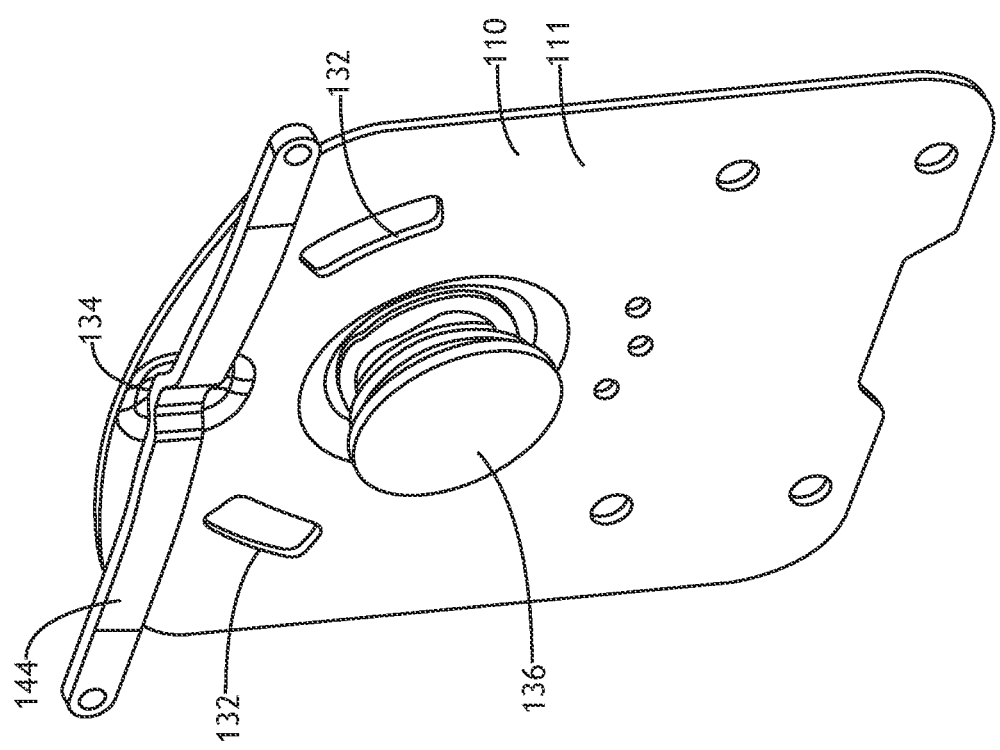
FIG. 17 is a front perspective view of the mounting plate assembly of the adjustable headrest assembly of FIG. 1 according to the inventive concepts disclosed herein.
Figure 18:
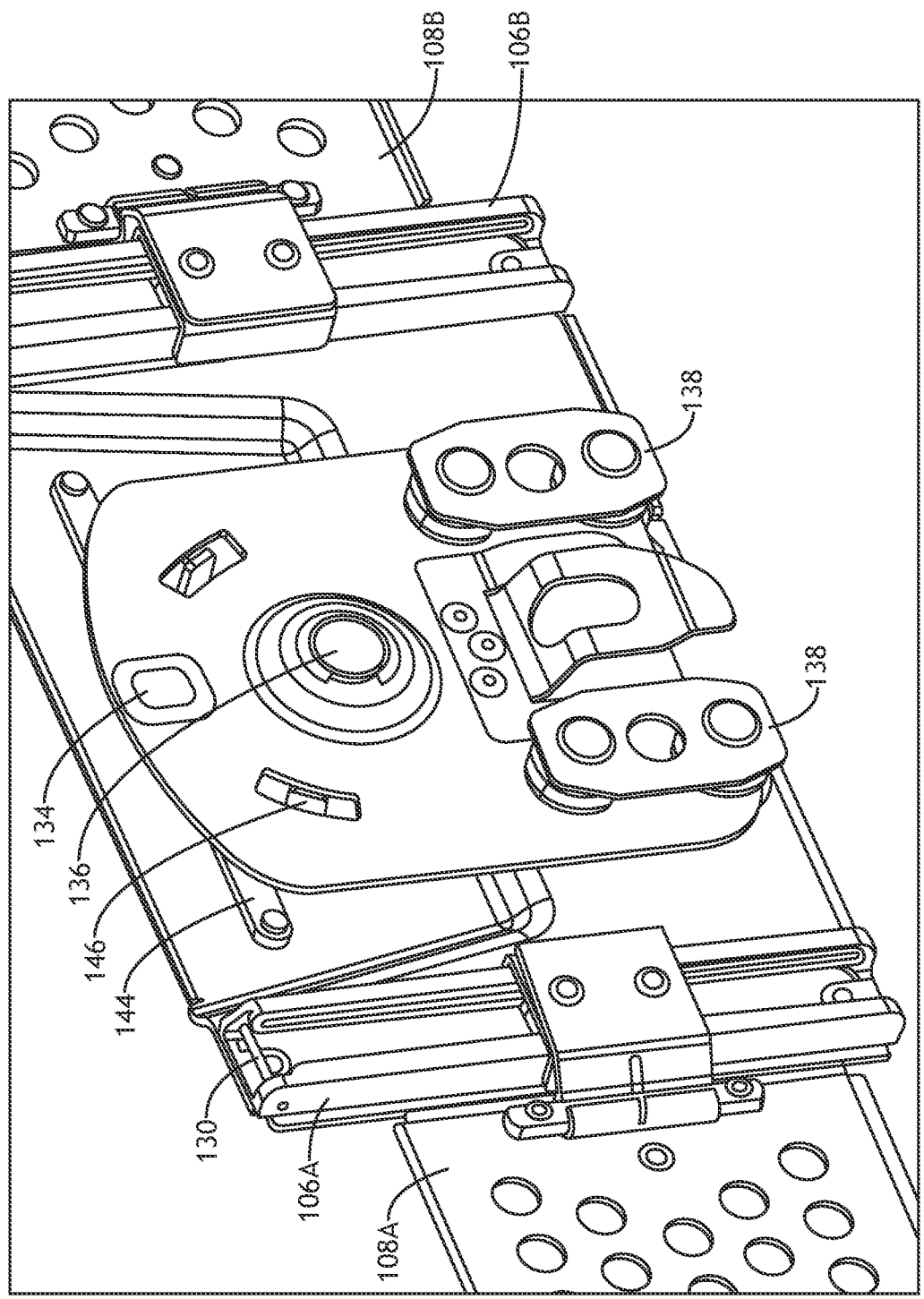
FIG. 18 is a rear perspective view of the adjustable headrest assembly of FIG. 1 according to the inventive concepts disclosed herein.

As shown in FIG. 17, the mounting plate assembly 110 may further include a detent spring 144 attached to the headrest center bracket 104 and configured to slide along a surface of the mounting plate 111 as the headrest center bracket 104 rotates relative to the mounting plate 111. The detent spring 144 may be configured to reside in the center position detent 134 of the mounting plate 111 when a rotational position of the headrest center bracket 104 is centered. The detent spring 144 may be composed of spring plastic. The detent spring 144 may provide feedback to a passenger when the detent spring engages with the center position detent 134.

Figure 19:
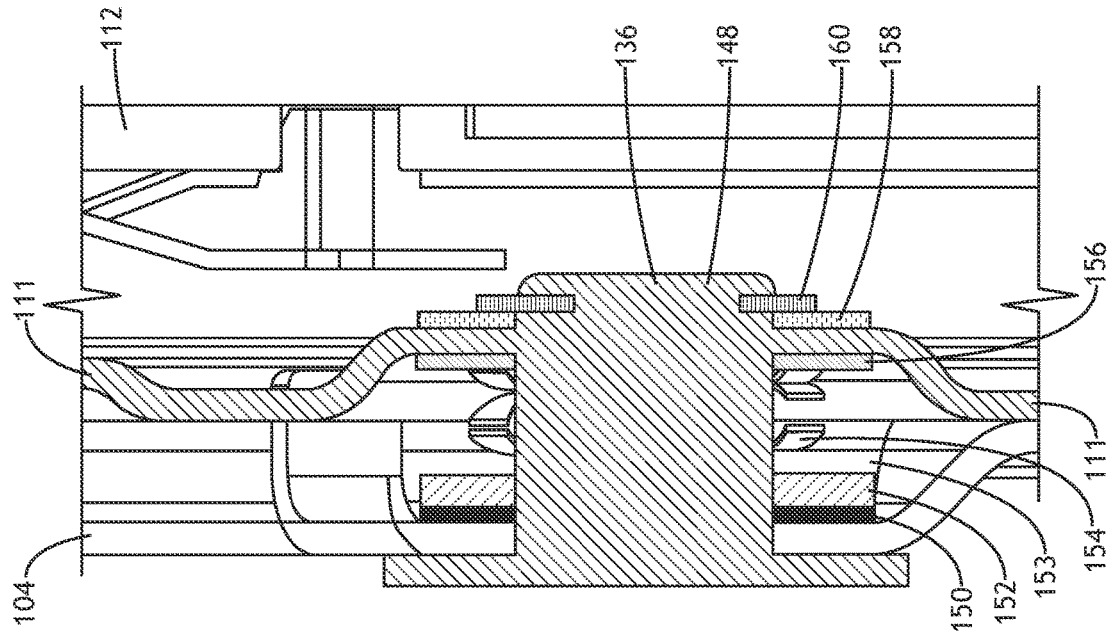
FIG. 19 is a cross-sectional view of the adjustable headrest assembly of FIG. 1 according to the inventive concepts disclosed herein.
Figure 20:
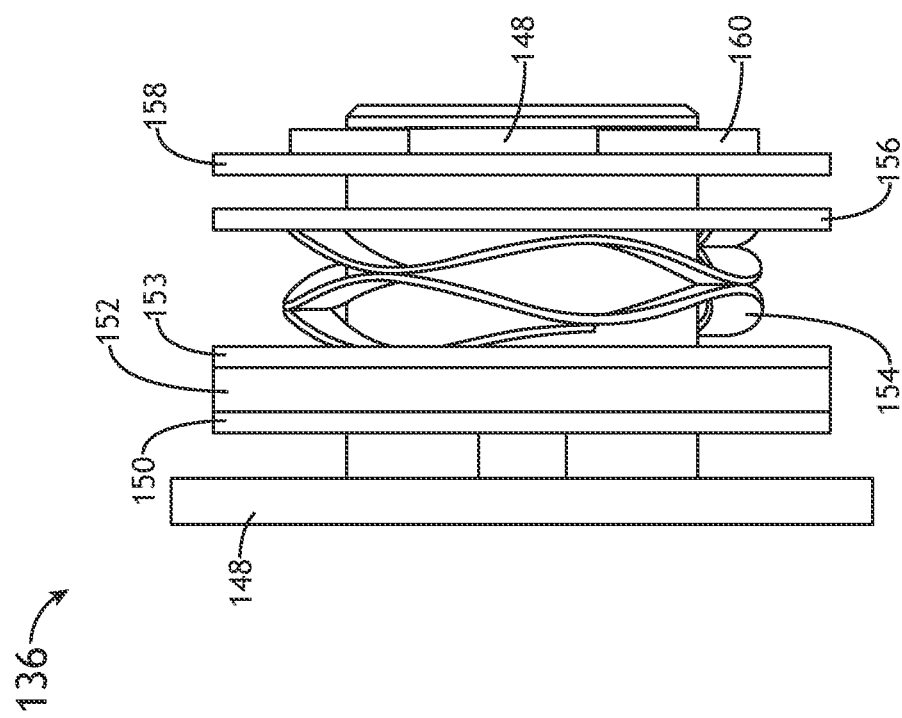
FIG. 20 is a side view of the friction pivot assembly of the mounting plate assembly of the adjustable headrest assembly of FIG. 1 according to the inventive concepts disclosed herein.

The mounting plate assembly 110 may further include a friction pivot assembly 136 allowing the headrest center bracket 104 to rotate relative to the mounting plate 111 that uses force applied by a spring 154 to a washer 152 (e.g., a rubber washer, such as a silicone washer) to cause a friction resistance to an amount of rotation that occurs unless a passenger applies a rotative force to the adjustable headrest assembly 102. As shown in FIGS. 19-20, the friction pivot assembly 136 may include: a rotational pin 148 extending through and/or between the headrest center bracket 104 and the mounting plate 111, wherein the rotational pin 148 may allow the headrest center bracket 104 to rotate relative to the mounting plate 111; a first washer 150 (e.g., a metal washer, such as a steel washer) positioned against the headrest center bracket 104 and around the rotational pin 148; a second washer 152 (e.g., a rubber washer, such as a silicone washer) positioned against the first washer 150 and around the rotational pin 148; a third washer 153 (e.g., a plastic washer, such as a non-nylon plastic washer) positioned against the second washer 152 and around the rotational pin 148; a spring 154 positioned against the third washer 153 and positioned around the rotational pin 148; a fourth washer 156 (e.g., a plastic washer, such as a non-nylon plastic washer) positioned between the spring 154 and the mounting plate 111 and positioned around the rotational pin 148; a fifth washer 158 (e.g., a plastic washer, such as a non-nylon plastic washer) positioned against the mounting plate 111 and around the rotational pin 148; and/or an e-clip 160 (e.g., a steel e-clip) positioned against the fifth washer 158 and at least partially around the rotational pin 148, wherein the e-clip 160 may be configured to hold components of the friction pivot assembly 136 together. For example, the spring 154 may create force between plastic washers 153,

156, 158 and subsequently on the silicone washer 152 to generate friction resistance. For example, non-nylon plastic washers may prevent slipping against the silicone washer.

Figure 16:
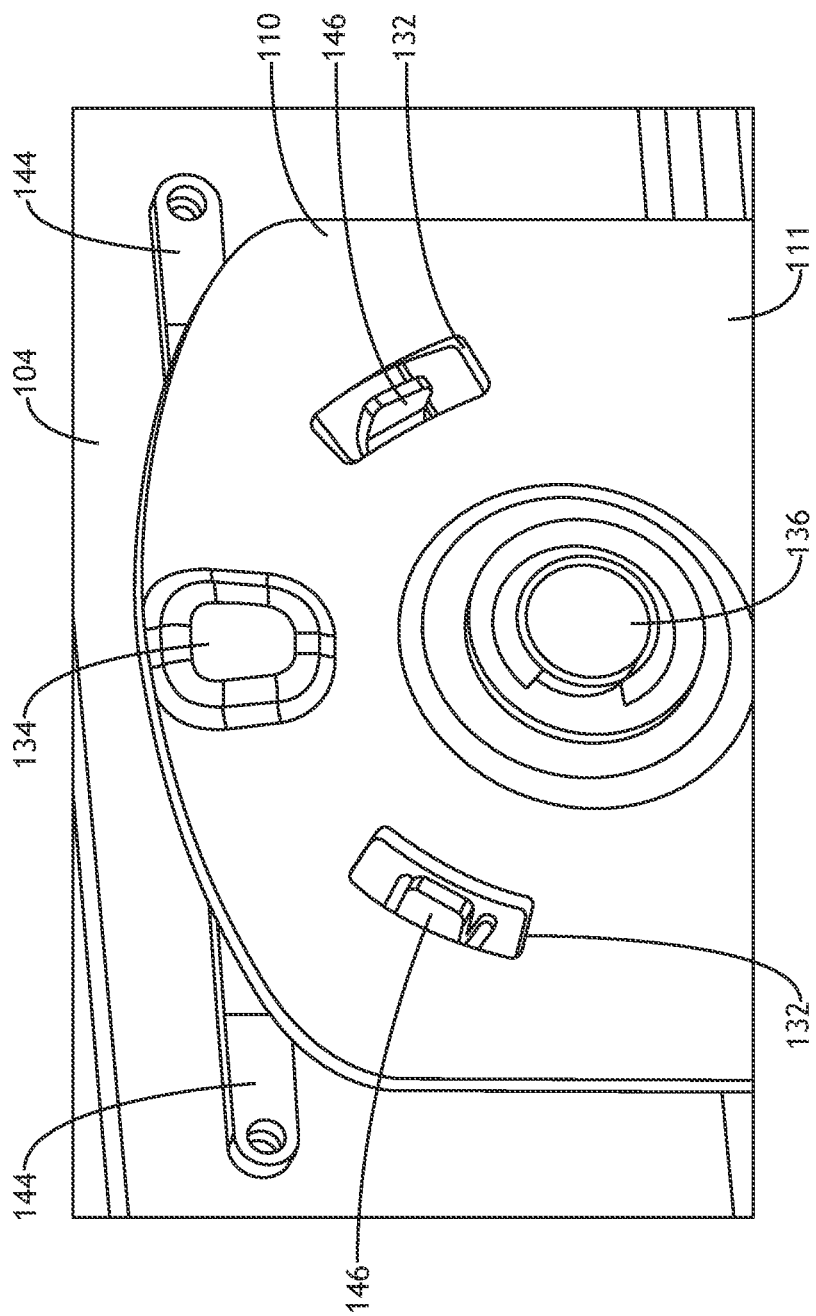
FIG. 16 is a rear perspective view of the adjustable headrest assembly of FIG. 1 according to the inventive concepts disclosed herein.

The mounting plate assembly 110 may further include at least one (e.g., two) rotation stop opening 132. The headrest center bracket 104 may have at least one (e.g., two) rotation stop 146 (as shown in FIG. 16), wherein each of the at least one rotation stop 146 may extend into one of the at least one rotation stop opening 132 such that an amount of rotation of the headrest center bracket 104 relative to the mounting plate 111 is limited (e.g., limited to 5-30% rotation off center, such as 15% in either direction).

As will be appreciated from the above, embodiments of the inventive concepts disclosed herein may be directed to a system including an adjustable headrest assembly.

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   an adjustable headrest assembly, comprising:
      a headrest center bracket;
      a left vertical side plate track positioned at a left side of the headrest center bracket;
      a left headrest side plate assembly comprising a left headrest side plate, the left headrest side plate assembly engaged with the left vertical side plate track, wherein the left headrest side plate is configured to move up and down relative to the left vertical side plate track based on the engagement of the left headrest side plate assembly with the left vertical side plate track, wherein the left headrest side plate is configured to rotate fore and aft about an axis positioned along an edge of the head rest center bracket, wherein the left headrest side plate assembly further comprises:
         a left friction clamp pin attached to the left headrest side plate;
         a left friction clamp rotatably engaged with the left friction clamp pin such that the left headrest side plate is able to rotate fore and aft about the axis;
         a left torque block attached to the left friction clamp;
         a left roller plate attached to the left torque block; and
         at least one left roller positioned between the left roller plate and the left torque block, wherein the at least one left roller engages with the left vertical side plate track such that the left headrest side plate is able to move up and down relative to the headrest center bracket;
      a right vertical side plate track positioned at a right side of the headrest center bracket; and
      a right headrest side plate assembly comprising a right headrest side plate, the right headrest side plate assembly engaged with the right vertical side plate track, wherein the right headrest side plate is configured to move up and down relative to the right vertical side plate track based on the engagement of the right headrest side plate assembly with the right vertical side plate track, wherein the right headrest side plate is configured to rotate fore and aft about another axis positioned along another edge of the head rest center bracket, wherein the right headrest side plate is configured to rotate fore and aft independently of the left headrest side plate being configured to rotate fore and aft, wherein the right headrest side plate assembly further comprises:
         a right friction clamp pin attached to the right headrest side plate;
         a right friction clamp rotatably engaged with the right friction clamp pin such that the right headrest side plate is able to rotate fore and aft about the other axis;
         a right torque block attached to the right friction clamp;
         a right roller plate attached to the right torque block; and
         at least one right roller positioned between the right roller plate and the right torque block, wherein the at least one right roller engages with the right vertical side plate track such that the right headrest side plate is able to move up and down relative to the headrest center bracket.

2. The system of claim 1,
   wherein the left headrest side plate assembly further comprises:
      a left headrest side plate doubler attached to the left headrest side plate and the left friction clamp pin,
      wherein the at least one left roller comprises two left rollers;

wherein the right headrest side plate assembly further comprises:
a right headrest side plate doubler attached to the right headrest side plate and the right friction clamp pin, wherein the at least one right roller comprises two right rollers.

3. The system of claim 1, wherein the adjustable headrest assembly further comprises a mounting plate assembly comprising a mounting plate, the mounting plate positioned behind the headrest center bracket, wherein the headrest center bracket is configured to rotate about a fore-aft axis positioned at a central location of the headrest center bracket, the fore-aft axis extending laterally forward and aft between the mounting plate and the headrest center bracket, wherein the left headrest side plate and the right headrest side plate rotate with the headrest center bracket.

4. The system of claim 3,
wherein the mounting plate assembly further comprises:
a friction pivot assembly allowing the headrest center bracket to rotate relative to the mounting plate.

5. The system of claim 4,
wherein the mounting plate assembly further comprises:
at least one rotation stop opening;
wherein the headrest center bracket has at least one rotation stop, wherein each of the at least one rotation stop extends into one of the at least one rotation stop opening such that an amount of rotation of the headrest center bracket relative to the mounting plate is limited.

6. The system of claim 4,
wherein the friction pivot assembly comprises:
a rotational pin extending through and/or between the headrest center bracket and the mounting plate, the rotational pin allowing the headrest center bracket to rotate relative to the mounting plate;
a first washer positioned against the headrest center bracket and around the rotational pin;
a second washer positioned against the first washer and around the rotational pin;
a third washer positioned against the second washer and around the rotational pin;
a spring positioned against the third washer and positioned around the rotational pin;
a fourth washer positioned between the spring and the mounting plate and positioned around the rotational pin;
a fifth washer positioned against the mounting plate and around the rotational pin; and
an e-clip positioned against the fifth washer and at least partially around the rotational pin.

7. The system of claim 3, wherein the mounting plate has a center position detent,
wherein the mounting plate assembly further comprises:
a detent spring attached to the headrest center bracket and configured to slide along a surface of the mounting plate as the headrest center bracket rotates relative to the mounting plate, wherein the detent spring is configured to reside in the center position detent when a rotational position of the headrest center bracket is centered.

8. The system of claim 3, wherein the adjustable head rest assembly further comprises a seatback mount plate having at least one vertical track,
wherein the mounting plate assembly further comprises:
at least one roller assembly, each of the at least one roller assembly comprising:
a roller plate attached to the mounting plate; and
at least one roller positioned between the roller plate and the mounting plate, wherein the at least one roller engages with one of the at least one vertical track of the seatback mount plate such that the mounting plate is able to move up and down relative to the seatback mount plate.

9. The system of claim 8, wherein the at least one vertical track comprises two vertical tracks, wherein the at least one roller assembly comprises two roller assemblies.

10. A system, comprising:
an adjustable headrest assembly, comprising:
a headrest center bracket;
a left vertical side plate track positioned at a left side of the headrest center bracket;
a left headrest side plate assembly comprising a left headrest side plate, the left headrest side plate assembly engaged with the left vertical side plate track, wherein the left headrest side plate is configured to move up and down relative to the left vertical side plate track based on the engagement of the left headrest side plate assembly with the left vertical side plate track;
a right vertical side plate track positioned at a right side of the headrest center bracket;
a right headrest side plate assembly comprising a right headrest side plate, the right headrest side plate assembly engaged with the right vertical side plate track, wherein the right headrest side plate is configured to move up and down relative to the right vertical side plate track based on the engagement of the right headrest side plate assembly with the right vertical side plate track; and
a mounting plate assembly comprising a mounting plate, the mounting plate positioned behind the headrest center bracket, wherein the headrest center bracket is configured to rotate about a fore-aft axis positioned at a central location of the headrest center bracket, the fore-aft axis extending laterally forward and aft between the mounting plate and the headrest center bracket, wherein the left headrest side plate and the right headrest side plate rotate with the headrest center bracket, wherein the mounting plate assembly further comprises a friction pivot assembly allowing the headrest center bracket to rotate relative to the mounting plate, wherein the friction pivot assembly comprises:
a rotational pin extending through and/or between the headrest center bracket and the mounting plate, the rotational pin allowing the headrest center bracket to rotate relative to the mounting plate;
a first washer positioned against the headrest center bracket and around the rotational pin;
a second washer positioned against the first washer and around the rotational pin;
a third washer positioned against the second washer and around the rotational pin;
a spring positioned against the third washer and positioned around the rotational pin;
a fourth washer positioned between the spring and the mounting plate and positioned around the rotational pin;
a fifth washer positioned against the mounting plate and around the rotational pin; and
an e-clip positioned against the fifth washer and at least partially around the rotational pin.

11. The system of claim 10,
wherein the mounting plate assembly further comprises:
at least one rotation stop opening;
wherein the headrest center bracket has at least one rotation stop, wherein each of the at least one rotation stop extends into one of the at least one rotation stop opening such that an amount of rotation of the headrest center bracket relative to the mounting plate is limited.

\* \* \* \* \*